May 25, 1954  D. H. MONTGOMERY  2,679,165
FEED MEANS FOR MACHINE TOOLS
Filed May 14, 1948  2 Sheets-Sheet 1

INVENTOR
DONALD H. MONTGOMERY
BY
*Mitchell Bechert*
ATTORNEYS

May 25, 1954  D. H. MONTGOMERY  2,679,165
FEED MEANS FOR MACHINE TOOLS
Filed May 14, 1948  2 Sheets-Sheet 2

INVENTOR
DONALD H. MONTGOMERY
BY
*Mitchell Bechert*
ATTORNEYS

Patented May 25, 1954

2,679,165

UNITED STATES PATENT OFFICE 2,679,165

FEED MEANS FOR MACHINE TOOLS

Donald H. Montgomery, West Hartford, Conn., assignor to The New Britain Machine Company, New Britain, Conn., a corporation of Connecticut Application May 14, 1948, Serial No. 26,946

16 Claims. (Cl. 74—57)

My invention relates to machine tools and in particular to an improved feed mechanism therefor.

It is an object of the invention to provide an improved device of the character indicated.

It is another object to provide an improved feed mechanism in which a tool and work may be fed relatively to each other at a substantially constant rate and in which the tool and work may be initially withdrawn relatively to each other faster than is usual.

It is also an object to provide an improved feed mechanism in which, at the end of a desired feed, a fast drawback may be initiated substantially without dwell.

It is a more specific object to provide an improved feed means whereby a high-speed cutting tool may be worked at a substantially constant speed and desired rate of advance with respect to the work, whereupon a snap-action drawback may abruptly terminate the feed.

It is a further object to provide an improved feed means that may prolong the life of a high-speed tool.

It is a general object to attain the above objects with a mechanism that is inherently simple and readily adaptable to existing machines.

Other objects and various further features of the invention will be pointed out or will occur to those skilled in the art from a reading of the following specification in conjunction with the accompanying drawings. In said drawings, which show, for illustrative purposes only, a preferred form of the invention:

Briefly stated, my invention contemplates an improved means for feeding a member, such as a work or tool carrier, in a machine of the character indicated. The principal feeding program may be governed by a cam of generally conventional design, and further means operating in timed relation with said cam may, either of its own accord or in cooperation with the cam, cause the fed member to be snapped back substantially without dwell. In one of the forms to be described, the modified feed produced by a second cam is effective bodily to displace the first or main cam in the feeding direction while the first cam passes the crest between its rise and its drawback surfaces. In the other forms to be described, the cam-follower means includes means for adjustably varying the length of the cam-follower means, and various alternatives are described for operating the adjustably variable mechanism. Stated in other words, the first or main feed cam may be effective to produce a normal desired rate of feed until substantially the crest of the cam is reached, whereupon dimensional limitations of the cam follower means may cause a relatively slow decay of the feed rate imparted to a tool just prior to drawback; I provide differential means for eliminating this slow-decay at the end of the feed stroke either by providing an additional incremental feed during the slow-decay period or by abruptly terminating the feed just prior to the slow-decay period.

Figure 1:
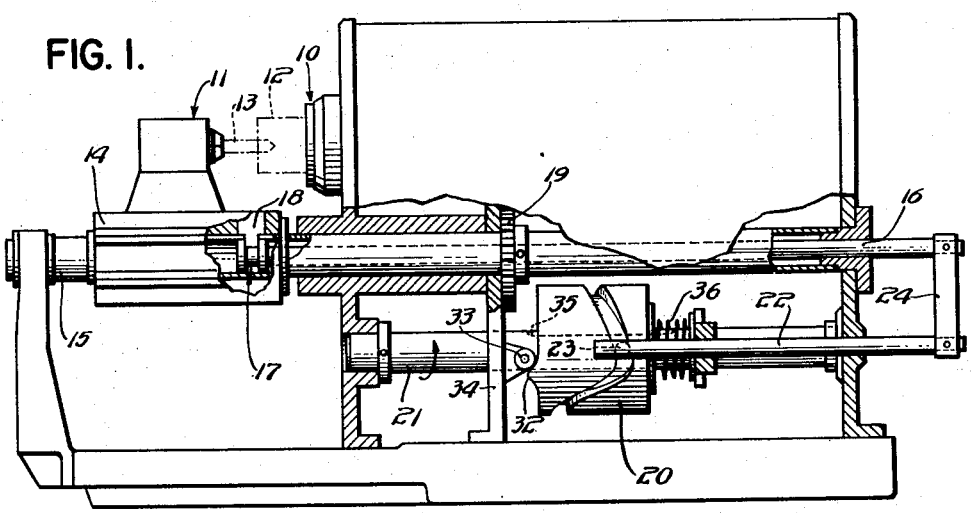
Fig. 1 is a partly sectionalized view in elevation of a machine incorporating a feed mechanism according to the invention.

Referring to Fig. 1 of the drawings, my invention is shown in application to a lathe-type machine including a work carrier 10 and a tool carrier 11. The work carrier may be the chuck or collet of a spindle for revolubly supporting tube or bar stock 12. The tool carrier 11 may include a holder for an end-working tool 13 and a supporting member, such as a slide 14, to be fed with respect to the work 12. In the particular machine shown, the carrier or slide 14 is a turret having a plurality of tool-holding stations and mounted on an arbor 15. Within the arbor tube 15 is a feed bar 16 which may carry a thimble 17 at its far end, to be engaged by a finger 18 on the tool slide 14. An indexing gear 19 within the power case of the machine transmits indexing motion to the arbor tube 15 and thence to the turret or tool carrier 14, whereby one of a number of tools such as the tool 13 may be serially placed opposite the work 12 for one of a series of end-working operations. Further structural details of the particular machine shown are disclosed in my copending application Serial No. 2,363, filed January 15, 1948.

In the form shown, feed motion for the feed bar and hence for the tool carrier 14 is derived from a cam 20 of the drum-type mounted upon a main camshaft 21 and driven by suitable means (not shown). A cam-follower rod 22 is slidably guided by the frame of the machine and includes a cam-follower roll 23 following the program of the cam 20. A cross piece or bar 24 rigidly interconnects the feed rods 22—16.

Figure 2:
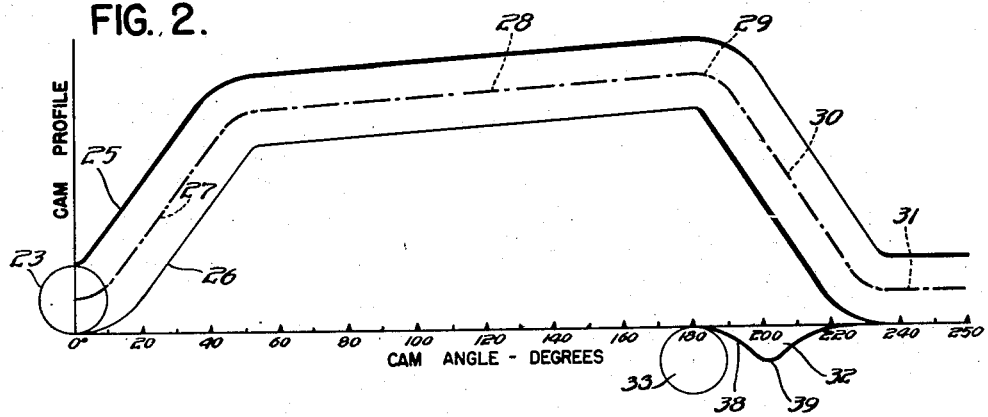
Fig. 2 is a graphical representation of cam profiles in the machine of Fig. 1.

In Fig. 2 the profile for the cam 20 will be seen to be conventional and to include continuous generally parallel guiding walls or surfaces 25—26, defining a jump 27, followed by a rise 28 peaking at a crest 29, followed in turn by a drawback 30 and a protracted dwell 31. Reference characters for the respective parts of the cam profile have been applied to a dot-dash line representing the path of the axis of the cam-follower roll 23, and for the form shown the axis of roll 23 has the same motion as that transmitted to the tool carrier 14. This motion has been plotted in Fig. 3 as a solid line, and it will be noted that at and immediately following the crest 29, tool-carrier drawback commences at a relatively slow pace, due in large part to the finite effective width of the cam-follower means, attributable to the radius of the cam-follower roll 23. This relatively slow initiation of drawback, or rather this relatively slow decay or tapering-off from the constant cutting advance due to the rise 28, may be likened to a momentary dwell and, in the feeding of high-speed tools, such as tungsten carbide tools, has been found to produce undesirable wear of the tool.

In accordance with the invention, I provide means for more rapidly initiating drawback of the tool slide 14, that is for effectively snapping a tool out of cutting contact with the work; this means may be differentially associated with the main feed cam 20. In the form shown in Fig. 1, I employ a second cam surface 32 bodily to displace the cam drum 20 in a further-feeding direction, preferably during and immediately following the crest 29 of the main cam 20. The second cam surface 32 may be formed with or mounted on the main cam drum 20 and cooperate with a cam-follower roll 33, fixedly supported as on a frame partition 34. The cam 20 may be slidably mounted on the camshaft 21 and keyed, as in the slot 35, against rotation relatively to the camshaft 21. Compressionally resilient means such as the spring 36 may normally urge the main cam 20 to ride on the cam-follower roll 33.

Figure 3:
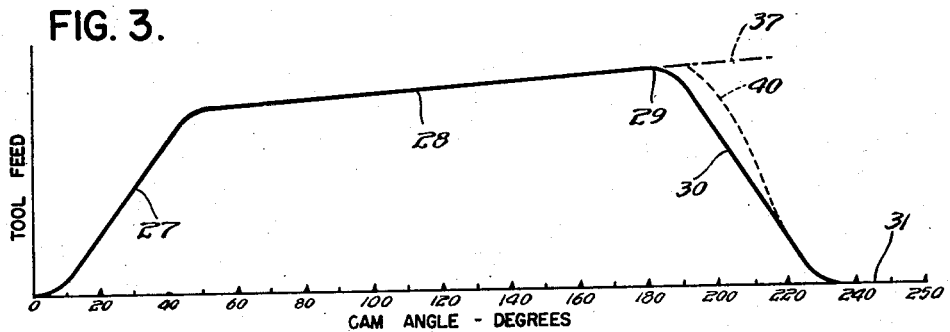
Fig. 3 is a graphical representation of tool feed as a function of cam angle in the machine of Fig. 1.

In accordance with a feature of the invention, the second cam surface 32 may be designed to produce an effective continuation of the same tool advance rate as would be provided by an extension of the rise 28. This extended feed is indicated in Fig. 3 by the dot-dash line 37, and it may be produced by the first part or rise 38 of the cam surface 32. Theoretically, the cam surface 38 could be extended indefinitely to provide continued advance of the tool, as determined by the rise 28. In a preferred form, however, I provide a crest 39 on cam 32 of as sharp a contour as is considered tolerable, the curvature of the crest being tangent to the surface 38. The crest 39 is preferably timed to occur after the cam-follower roll 23 has traversed the crest 39 and has substantially entered the linear portion of the drawback part 30 of the main cam profile. Stated in other words, I prefer that the rise 38 of the second cam 32 be of requisite contour to assure constancy of feed, and that the crest 39 provide the maximum possible change of curvature, at a time when the main-cam drawback rate (part 30 of the program) is greatest, thus effecting a snap-action in the initial phase of tool drawback. It will be understood that the resultant tool feed may be depicted in Fig. 3 by the dotted curve 40, the initiation of drawback from the linear rise extension 37 being enhanced substantially over the relatively slow departure which is characteristic of the main-cam profile alone.

Figure 4:
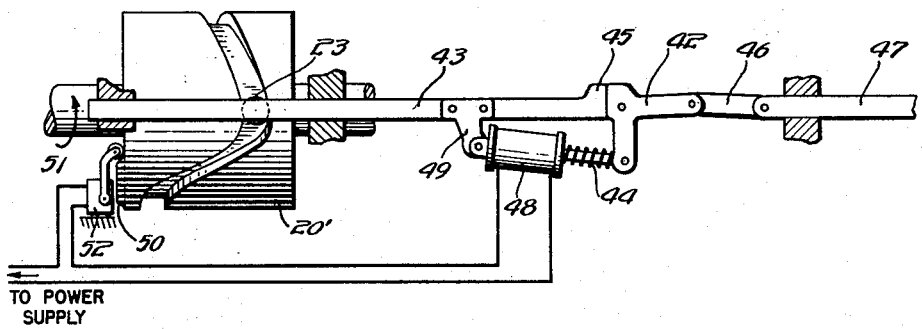
Fig. 4 is a fragmentary schematic illustration of an alternative feed mechanism according to the invention.

In Fig. 4, I show an alternative differential means for accomplishing relatively fast or snap-action in initial drawback of the tool carrier 14. In accordance with the arrangement of Fig. 4, however, I employ feed means including an adjustably variable element, as provided by a toggle. The adjustably variable element may be interposed between the machine frame and the cam 20' to displace the cam as in Fig. 1, or it may be placed between the cam 20' and the movable carrier, as shown. The variable element or toggle may include a bellcrank member 42 pivotally carried at the end of the cam-follower rod 43 which carries the cam-follower roll 23, and a compression spring 44 may normally urge the bellcrank 42 against a stop lug 45 on the cam-follower rod 43. A free link 46 connects the toggle arm of bellcrank 42 to the rod 47 which is to transmit feeding motion to the tool carrier 14, and which may be anchored to feed rod 16, as by the crossbar 24.

In accordance with the invention, I provide a means for rapidly breaking the toggle connection 42—46 in timed relation with operation of the main cam 20; in the form shown, I employ a solenoid 48, which may be carried by a bracket 49 on the cam-follower rod 43 and which may include an armature connected to an arm of the bellcrank 42. The solenoid 48 may be energized to break the toggle, and thus rapidly to initiate withdrawal of the tool carrier, by limit-switch means effective as the cam-follower means 43 approaches the crest at the end of the rise in the main cam 20. In the form shown, a second cam surface 50 is provided on the cam 20 to operate a follower 51 which may be the actuating arm of an electric switch 52 in series with the solenoid 48.

Figure 5:
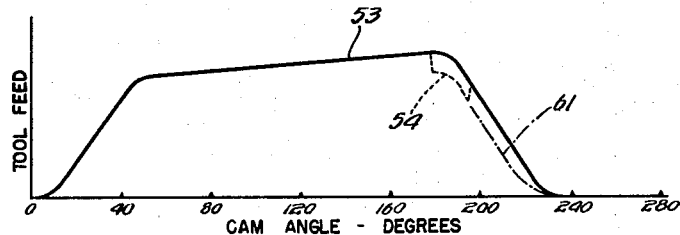
Fig. 5 is a graphical presentation similar to that in Fig. 3, but representative of the feed produced by arrangement of Fig. 4.

It will be understood that with the arrangement of Fig. 4 the tool carrier 14 may be fed in accordance with the program of Fig. 5, wherein the solid line 53 represents the program that would normally be provided by the main cam alone. Under the influence of switch 52 and solenoid 48, however, the toggle in the cam-follower means may be rapidly broken to effect a correspondingly fast retraction of the tool carrier 14. The broken toggle may be so held until the tool is safely out of a cutting relation with the work, as indicated by the dotted curve 54 of Fig. 5. It will be understood that the length of the high surface on the cam 50 may determine the period during which the toggle remains broken and that when the follower 51 rides down from cam 50, the solenoid 58 may be deenergized to allow the spring 44 to reposition the toggle for the next feeding cycle.

Figure 6:
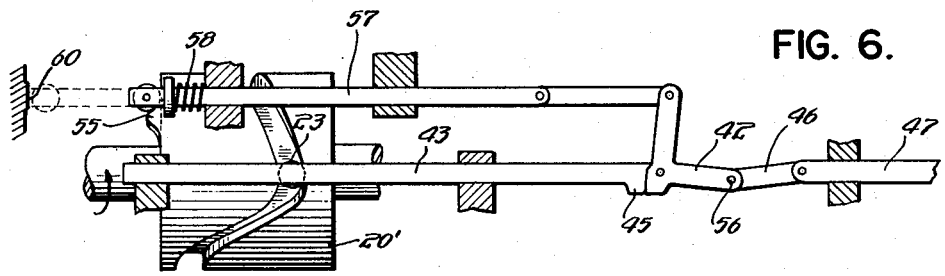
Figs. 6 and 7 are fragmentary schematic illustrations of further embodiments of the invention.

In Fig. 6, I show a modification of the toggle arrangement of Fig. 4 in which the main cam 20' will be recognized as actuating the cam-follower rod 43 through the roll 23, and in which the bellcrank 42 forms part of a toggle connection with the link 46. In Fig. 6, however, I employ cam means, such as a cam 55, as a direct method of breaking the toggle, and again the cam means 55 is preferably timed to release the toggle, that is, to initiate tool retraction, just before the cam follower 43 nears the crest of the main cam program.

As in the case of Fig. 4, the toggle of Fig. 6 is preferably set with its central pin 56 on the line of centers or just past dead center for the make condition, that is, during the feeding stroke. When the auxiliary cam-follower rod 57 is withdrawn under the influence of cam 55, the bellcrank 42 is pulled in a direction to break the toggle, and this break will be understood to initiate drawback with a snap action. The spring 58 may serve to hold the broken toggle relationship for an extended period until the drawback surface of the main cam 20' has effected substantially a full retraction of the tool. Just before completing the retraction, the cam-follower rod 57 may engage an abutment or stop 60 on the frame of the machine, so that continuing drawback action on the cam-follower rod 43, in combination with the arrested motion of the cam-follower rod 57 may serve to reset the toggle, as will be clear. The feed program produced by the cammed toggle arrangement of Fig. 6 will be understood to result in a tool-feed program such as that indicated roughly by the dot-dashed extension 61 of the dotted curve 54 in Fig. 5.

Figure 7:
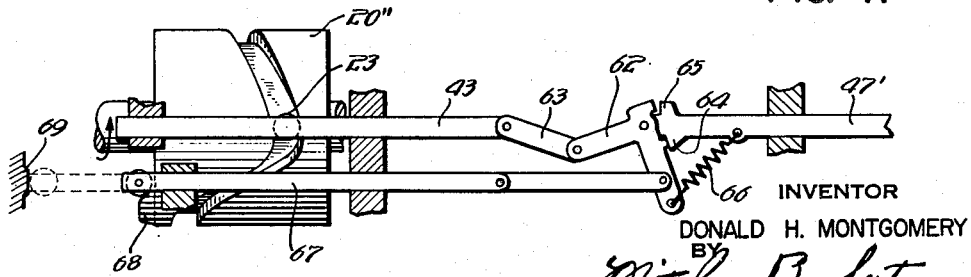

In Fig. 7, I show a further modification of the arrangement of Fig. 4 in which a toggle is employed effectively to extend the rise of the main cam 20'' and in which cam means are employed to effect this extension upon a making of the toggle. The cam follower 43 and its roll 23 (Fig. 7) will be recognized from the previous description, but the bellcrank 62 and link 63 are reversed in their association with the feed rod 47 for the tool carrier 14. The bellcrank 62 may thus be pivoted on the feed rod 47', and the rod 47' may include stop means in the form of a lug 64 to hold the toggle in a given broken position (as during a feed stroke) and stop means, such as a lug 65, to hold the toggle in a make position. Resilient means such as a tension spring 66 may serve normally to hold the toggle in the broken position shown.

In accordance with a feature of the invention, an auxiliary cam-follower rod 67 may be actuated by a second cam surface 68 on the cam drum 20'', and the cam-follower rod 67 may be linked to the actuating arm of the bellcrank 62. In a preferred form, the second cam 68 begins its rise as the rise of the main cam 20'' begins to taper off towards its crest, and the toggle is thus slowly moved toward a make position as the cam-follower roll 23 rides over the crest of the main cam 20''. As in the extended-feed case of Fig. 1, the surface of cam 68 is preferably such as to effect substantially a full making of the toggle, as by abutment of bellcrank 62 against lug 65, after the roll 23 has substantially entered the linear portion of the drawback of cam 20''. Again, a stop, such as the abutment 69 on the frame of the machine, may intercept the cam-follower rod 67 just before the drawback surface of the main cam has fully retracted the tool slide and its feeding linkages. Such interception will be understood to break the toggle and to permit the spring 66 to retain the broken arrangement, thus setting up the mechanism for another feed cycle. It will be understood that with an appropriately designed cam 68, tool drawback may be initiated relatively fast and with a program generally similar to that shown by the dotted line 40 in Fig. 3.

It will be seen that I have described relatively simple mechanisms that may be readily adapted to existing machines to provide faster initial drawback speeds for the abrupt termination of a given feed. All mechanisms may be adapted to conventional cams.

While I have described my invention in detail for the preferred forms shown, it will be understood that modifications may be made within the scope of the invention as defined in the appended claims.

I claim:

1. In combination, a relatively fixed member, feed means comprising two cams connected for synchronized operation and supported by said relatively fixed member, separate cam-follower means for each of said cams, each of said cams having single continuous programs with feed and retraction surfaces, the displacement-producing part of the first of said cams being limited to a relatively small fraction of the full cycle of both said cams and being located relatively to the program of the second of said cams to engage its cam-follower means substantially concurrently with the end of the feed of said second cam, a movable element to be positioned by said cams, and actuating means connected to said element, said actuating means being differentially connected to both said cam and cam-follower means and reacting against said relatively fixed member.

2. The combination of claim 1, and including rotatable means journaled in said relatively fixed member, and means fixedly supporting both said cams on said rotatable means.

3. In combination, a relatively fixed member, feed means comprising two cams connected for synchronized operation and supported by said relatively fixed member, separate cam-follower means for each of said cams, each of said cams having programs with feed and retraction surfaces, the displacement-producing part of a first of said cams being limited to a relatively small fraction of the full cycle of both said cams and being located relatively to the program of the second of said cams to engage its cam-follower means substantially concurrently with the end of the feed of said second cam, a movable element to be positioned by said cams, means connected to said element and differentially responsive to the actions of both said cam and cam-follower means, guide means on said relatively fixed member for the movable guided support of one of said cams along an axis more or less aligned with the axis of movement of the cam-follower means therefor, means rigidly connecting the other of said cams to said one cam, and relatively fixed support means for the cam-follower means for said other cam.

4. In combination, a frame, a first rotary cam having a given feed and retraction program, follower means tracking said cam and movably guided by said frame, guide means carried by said frame and supporting said cam for bodily displaceable movement generally in the direction of movement of said follower means, and further coacting cam and follower elements having a feed and retraction program synchronized with that of said rotary cam, one of said programs being relatively short compared to the other and being restricted substantially to the effective interval of transfer from the feed to the retraction parts of the other of said programs, and one of said elements being carried by said frame, while the other of said elements is fixed with respect to said rotary cam at least in said direction of movement of said follower means.

5. In combination, a frame, a drum cam journalled for rotation in said frame and guided for limited sliding movement with respect to said frame on the axis of rotation, said cam having two feed and retraction programs, one of said programs being relatively short compared with the other and being restricted substantially to the effective interval of transfer from the feed to the retraction parts of the other of said programs, a movable element to be positioned by said programs, cam-follower means connected to said movable element and tracking one of said programs and movably supported by said frame for movement in the general direction of said rotary axis, and second follower means carried by said frame and in tracking relation with the other of said programs, whereby said movable element is effectively differentially connected to both said programs.

6. In combination, a relatively fixed element, a movable element to be moved relatively to said relatively fixed element, and feed means for said movable element, said feed means comprising two axial cam and follower means, each said cam and follower means including a cam surface with a feed and retraction program, one of said programs being relatively short compared with the other and being restricted substantially to the effective interval of transfer from the feed to the retraction parts of the other of said programs, and actuating means differentially responsive to both said cam and follower means and in actuating relation with said movable element, one of said cam and follower means reacting against said relatively fixed element.

7. The combination of claim 6, in which said actuating means includes an adjustably variable connection between one of said cam and follower means and said movable element, the other of said cam and follower means being connected in adjustably varying controlling relation with said adjustably variable connection.

8. The combination of claim 6, in which said actuating means includes a toggle connecting one of said cam and follower means to said movable element, the other of said cam and follower means being connected in actuating relation with said toggle.

9. The combination of claim 8, in which said toggle is normally set in the make position thereof during the stroke resulting from the feed program of said one cam and follower means, and in which said other cam and follower means is connected to break said toggle toward the end of the feed program of said one cam and follower means.

10. The combination of claim 8, and including resilient means normally urging said toggle into the make position thereof.

11. The combination of claim 8, in which said toggle is normally set in the broken position thereof during the stroke resulting from the feed program of said one cam and follower means, and in which said other cam and follower means is connected to actuate said toggle to the make position thereof toward the end of the feed program of said one cam and follower means.

12. The combination of claim 8, and including resilient means normally urging said toggle into the broken position thereof.

13. The combination of claim 8, and including cooperating abutments on said fixed element and on said toggle and in actuating relation with said toggle upon a movement of said toggle responsive to the program of said one cam and follower means.

14. The combination of claim 8, in which said toggle connection includes two mutually pivoted members, each said pivoted member having separate pivotal connection to separate parts in the chain of feed-means parts, cooperating abutment means on one of said pivoted members and on another part of said feed means and limiting relative pivoting of said pivoted members on one side of the dead-center position of said pivoted members, said other cam and follower means being connected to actuate said pivoted members toward the other side of the dead-center position and away from the relative position in which said abutment means cooperate.

15. The combination of claim 8, in which said toggle connection includes two mutually pivoted members, each said pivoted member having separate pivotal connection to separate parts in the chain of feed-means parts, cooperating abutment means on one of said pivoted members and on another part of said feed means and limiting relative pivoting of said pivoted members on one side of the dead-center position of said pivoted members, said other cam and follower means being connected to actuate said pivoted members from the other side of the dead-center position and toward the relative position in which said abutment means cooperate.

16. The combination of claim 8, in which said toggle connection includes two mutually pivoted members, each said pivoted member having separate pivotal connection to separate parts in the chain of feed-means parts, toggle-shifting means connected to one of said pivoted members for moving said pivoted members toward one side of the dead-center position of said pivoted members, and electric-control means connected in actuating relation with said toggle-shifting means, said electric-control means including means responsive to said other cam and follower means.

References Cited in the file of this patent

UNITED STATES PATENTS

| Number | Name | Date |
|---|---|---|
| 210,940 | Kendall | Dec. 17, 1878 |
| 491,896 | Layton | Feb. 14, 1893 |
| 1,346,139 | Smith | July 13, 1920 |
| 1,557,492 | Daniels | Oct. 13, 1925 |
| 1,816,571 | Drissner | July 28, 1931 |
| 2,007,564 | Dixon | July 9, 1935 |
| 2,493,420 | Ranney et al. | Jan. 3, 1950 |

FOREIGN PATENTS

| Number | Country | Date |
|---|---|---|
| 314,022 | Germany | July 30, 1919 |